United States Patent [19]
Kato et al.

[11] Patent Number: 5,581,167
[45] Date of Patent: Dec. 3, 1996

[54] FLEXIBLE SERVO CONTROL METHOD

[75] Inventors: Tetsuaki Kato; Soichi Arita; Masaru Nakamura, all of Yamanashi, Japan

[73] Assignee: Fanuc Ltd., Yamanashi, Japan

[21] Appl. No.: 373,225

[22] PCT Filed: May 12, 1994

[86] PCT No.: PCT/JP94/00765

§ 371 Date: Jan. 19, 1995

§ 102(e) Date: Jan. 19, 1995

[87] PCT Pub. No.: WO94/27200

PCT Pub. Date: Nov. 24, 1994

[30] Foreign Application Priority Data

May 19, 1993 [JP] Japan ................... 5-139288

[51] Int. Cl.$^6$ ........................ G05D 3/12
[52] U.S. Cl. ............. 318/609; 318/568.1; 318/568.12; 318/610
[58] Field of Search ............... 318/560–696; 901/3, 5, 7, 9, 13, 18–20; 395/80–89

[56] References Cited

U.S. PATENT DOCUMENTS

| | | | |
|---|---|---|---|
| 4,737,697 | 4/1988 | Maruo | 318/568 |
| 4,860,215 | 8/1989 | Seraji | 364/163 |
| 4,868,474 | 9/1989 | Lancraft et al. | 318/568.2 |
| 5,049,796 | 9/1991 | Seraji | 318/568.1 |
| 5,243,266 | 9/1993 | Kasagami et al. | 318/568.1 |

FOREIGN PATENT DOCUMENTS

| | | |
|---|---|---|
| 0423357 | 4/1991 | European Pat. Off. . |
| 61-143803 | 7/1986 | Japan . |
| 63-285617 | 11/1988 | Japan . |
| 1-255015 | 10/1989 | Japan . |
| 1-310889 | 12/1989 | Japan . |
| 4-98722 | 8/1992 | Japan . |

*Primary Examiner*—Paul Ip
*Attorney, Agent, or Firm*—Staas & Halsey

[57] ABSTRACT

A robotic arm is driven by a servomotor which is controlled through position and speed control loops. The position and speed control loops are adaptable in response to a flexible position control. Upon receipt of a flexible control command, a position gain and a proportional gain of the speed control loop are lowered in accordance with a set degree of flexibility. The output of an integrator of the speed control loop is also limited to a set clamp value. As a result, a torque command for controlling the servomotor never achieves an expressly large value even if a position deviation increases. In case an obstacle is placed in the transfer path of the robotic arm, the arm can be moved by human power to avoid the obstacle.

10 Claims, 2 Drawing Sheets

1

FLEXIBLE SERVO CONTROL METHOD

TECHNICAL FIELD

The present invention relates to control of a servomotor for driving a robot arm and the like, and more particularly, to a servo control method including position and speed control loops and which is adapted for position control.

BACKGROUND ART

For control of a robot arm and the like, a servomotor for driving the arm includes position and speed control loops. The position of a driven body, such as the arm, is controlled by controlling the position of the servomotor. FIG. 2 is a block diagram of a servo control system for controlling one such driven body.

In FIG. 2, reference numeral 1 designates a position gain Kp in the position loop. Reference numerals 2 and 3 designate terms of a transfer function of the speed loop; 2, a term of an integrator; and K1, an integral gain. Reference numeral 3 designates a proportional term, and K2 a proportional gain. Reference numeral 4 designates a term of a transfer function of the motor; Kt, a torque constant; J, an inertia; value and A, a viscous friction term. Moreover, reference numeral 5 designates a transfer function by which a motor speed v is integrated to obtain a motor position y. Symbol s represents a Laplace operator.

A position deviation value $\epsilon p$ is obtained from a move command r and the motor position y. A speed command vc is obtained by multiplying the position deviation $\epsilon p$ by the position gain Kp. A speed deviation $\epsilon v$ is obtained from the speed command vc and the motor speed v. A torque command Tc is obtained by adding up the product of the integral gain K1 and a value obtained by integrating the speed deviation $\epsilon v$ by way of the integrator 2 and the product of the speed deviation $\epsilon v$ and the proportional gain K2. The motor 4 is driven according to this torque command Tc.

The control system for the driven body such as a robot arm, which is driven by ways of the servomotor and whose position is controlled, is generally controlled by way of a control system such as the one described above. Although PI control is used for the control of the speed loop in the aforesaid case of FIG. 2, IP control may be used instead, in some cases.

If the servomotor is controlled by the aforementioned control system, a driven body such as the robot arm moving toward a position assigned by a position command cannot keep away from an obstacle, if any, in the way, and continues to move toward a target position. If the accuracy of a workpiece is so low that there is some deviation between the command position and the position of the workpiece, while the robot is carrying out an operation to attach the workpiece to a machine tool by its hand, for example, the workpiece cannot be attached to the machine tool. In this case, moreover, it is difficult to move the robot arm manually, thereby moving the workpiece to a mounting position in the machine tool.

The reason is that the servomotor cannot move to the target position due to the presence of the obstacle though it is urged to move toward that position. Accordingly, the position deviation increases, so that the speed command Vc obtained by multiplying this position deviation by the position gain Kp also increases. Since the difference between the speed command Vc and the motor speed (this speed is "0" when engaged with the obstacle) is integrated by the integrator Z of the speed loop, the integral value in this integrator 2 gradually increases, so that the torque command Tc takes a large value. Thus, the servomotor outputs a maximum torque such that it reaches the target position. Accordingly, a human power $\tau$ cannot easily move the arm or the like to the intended position without being caught by the obstacle.

SUMMARY OF THE INVENTION

Accordingly, an object of the present invention is to provide a servo control method in which an obstacle, if any, in the path of transfer of a driven body which is driven in response to a given position command can be dodged manually.

In order to achieve the above object, according to one aspect of the present invention, there is provided a flexible servo control method fop a servomotor controlled in a control system which is provided with a position control loop and a speed control loop, in which a position gain and a proportional gain of the speed control loop are lowered to previously set values, individually, when a flexible control command is inputted, and the servomotor is driven with the output of an integrator of the speed control loop clamped to a set value, so that a driven body driven by way of the servomotor can be moved manually.

Preferably, the value in the integrator of the speed control loop immediately before the entry of the flexible control command is stored in a register in advance. The position gain and the proportional gain of the speed control loop are the restored to original gains to release the integrator of the speed control loop from clamping when the flexible control command is canceled. The value stored in the register is then set in the integrator, and position control loop and speed control loop processing are executed to drive the servomotor.

According to another aspect of the present invention, moreover, there is provided a flexible servo control method for a servomotor controlled in a control system which is provided with a position control loop and a speed control loop, in which a position gain and a proportional gain of the speed control loop are lowered to previously set values, individually, when a flexible control command is inputted, the value in an integrator of the speed control loop is stored in a register, the integrator is cleared, and the output of the integrator is clamped to a set value as position control loop and speed control loop processing are executed in accordance with the lowered position and proportional gains, and the servomotor is driven in a manner such that a value obtained by adding the value stored in the register to an obtained torque command is used as a torque command, so that a driven body driven by way of the servomotor can be moved manually.

Preferably, the position gain and the proportional gain of the speed control loop are restored to original gains to release the integrator of the speed control loop from clamping when the flexible control command is canceled, and the position control loop and speed control loop processing are executed to drive the servomotor in a manner such that a value stored in the register is set in the integrator.

Further preferably, the set value to which the output of the integrator is clamped is a value substantially equivalent to the frictional resistance.

According to the present invention, as described above, the position gain and the proportional gain of the speed control loop are lowered in accordance with the degree of flexibility, and the output of the integrator of the speed control loop is limited to the set clamp value. Thus, even if a position deviation increases, the torque command never increases in particular, so that the driven body driven by way of the servomotor can be moved by human power. In case there is an obstacle in the path of transfer of the driven body which is driven by this servomotor, therefore, the obstacle can be dodged manually. When the method is applied to a robot, in particular, a robot hand can be manually located in a position different from an instruction program by human compulsion.

BEST MODE OF CARRYING OUT THE INVENTION

Figure 1:
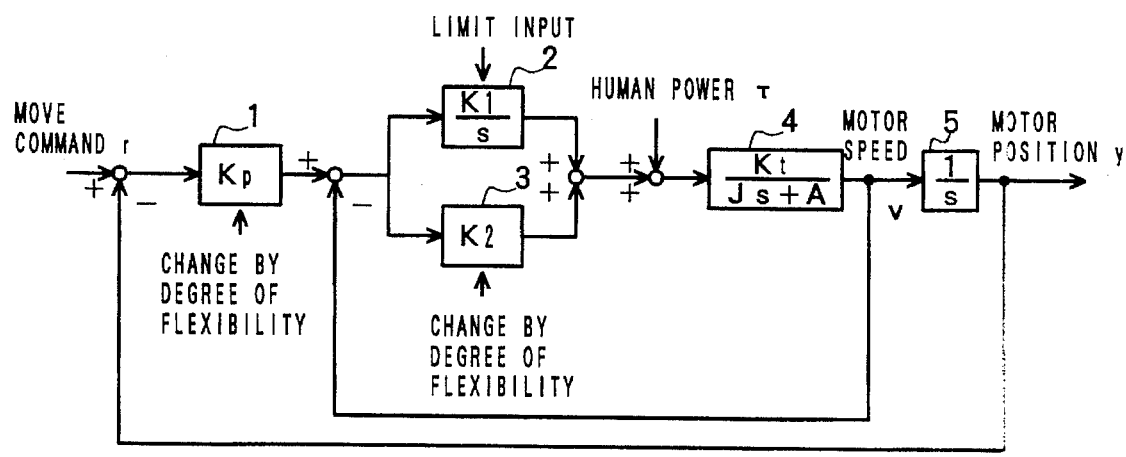
FIG. 1 is a block diagram of a servo control system according to the present invention.
Figure 2:
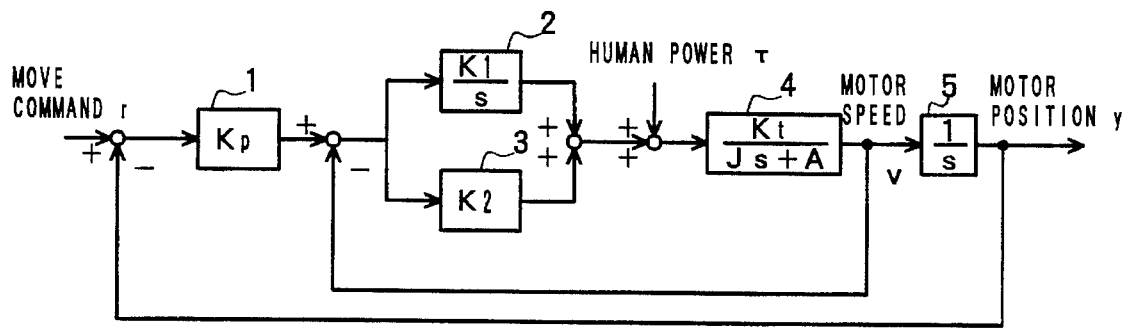
FIG. 2 is a block diagram of a prior art servo control system.

FIG. 1 is a block diagram of a servo control system for carrying out a flexible servo control method according to the present invention. This system differs from the prior art servo system shown in FIG. 2 in that the position gain Kp of the position control loop and the proportional gain K2 of the speed control loop are modified into gains which are set in accordance with a degree of flexibility, i.e. of flexible control, and that the output of the integrator 2 of the speed control loop is limited to a set clamp value.

Since the position gain takes a value smaller than a conventional position gain depending on the degree of flexibility, the speed command obtained by multiplying the position deviation by this gain Kp is also smaller than in the case of the conventional control. Accordingly, the speed deviation or the difference between this speed command and the motor speed are also smaller than in the conventional case. Since the proportional gain K2 of the speed control loop is also modified into a value smaller than in the conventional case, an output value from the proportional term 3 is also smaller than a conventional value. Since the output of the integrator 2 of the speed control loop is limited to the clamp value, the torque command Tc never takes a large value, so that even the human power τ can move the driven body which is driven by the servomotor.

Figure 3:
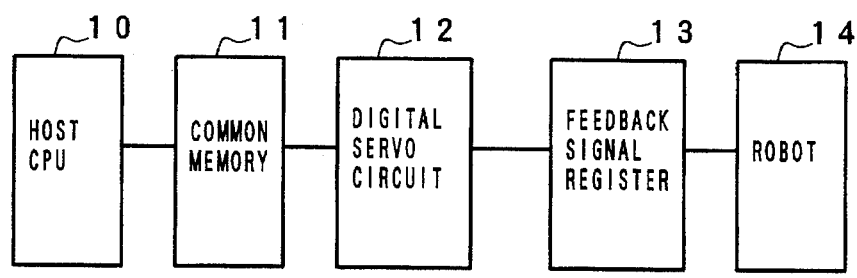
FIG. 3 is a block diagram of a robot control system according to one embodiment for carrying out a control method according to the present invention.

FIG. 3 is a block diagram of a robot control system for carrying out one embodiment of the present invention.

In FIG. 3, reference numeral 10 denotes a host computer for controlling a robot, and 11 denotes a shared memory (RIM) which is used to deliver move commands and control commands outputted from the host computer to a processor of a digital servo circuit, which will be mentioned later, and on the other hand, deliver various signals from the processor of the digital servo circuit to the host computer. Reference numeral 12 denotes the digital servo (software servo) circuit for executing the aforesaid servo control, which is composed of the processor and memories such as a ROM, RAM, etc. Reference numeral 13 denotes a feedback register which is loaded with position feedback values, speed feedback values, current feedback values, etc. of individual servomotors for a robot 14.

Referring to the flow chart of FIG. 4, processes of servo control including the flexible control of the present invention, which are executed by the processor of the digital servo circuit 12 in this robot control system, will be described.

A flexible control command and a cancel command may be manually inputted by an operator, or a program region for the flexible control may be assigned beforehand by way of a program. The values of the position gain Kp, integral gain K1 of the speed control loop, and proportional gain K2, which are used in the conventional servo control, are set as Kpn, K1n and K2n, respectively. Moreover, the values of the position gain Kp and the proportional gain K2, which decide the flexibility of the flexible control, are set in terms of the ratio (%) to their conventional values, the position gain and the proportional gain being given as Bp% and B2%, respectively. Also, the clamp value $C_L$ to which the output of the integrator 2 is limited is previously set as a value which is substantially equivalent to the frictional resistance.

Figure 4:
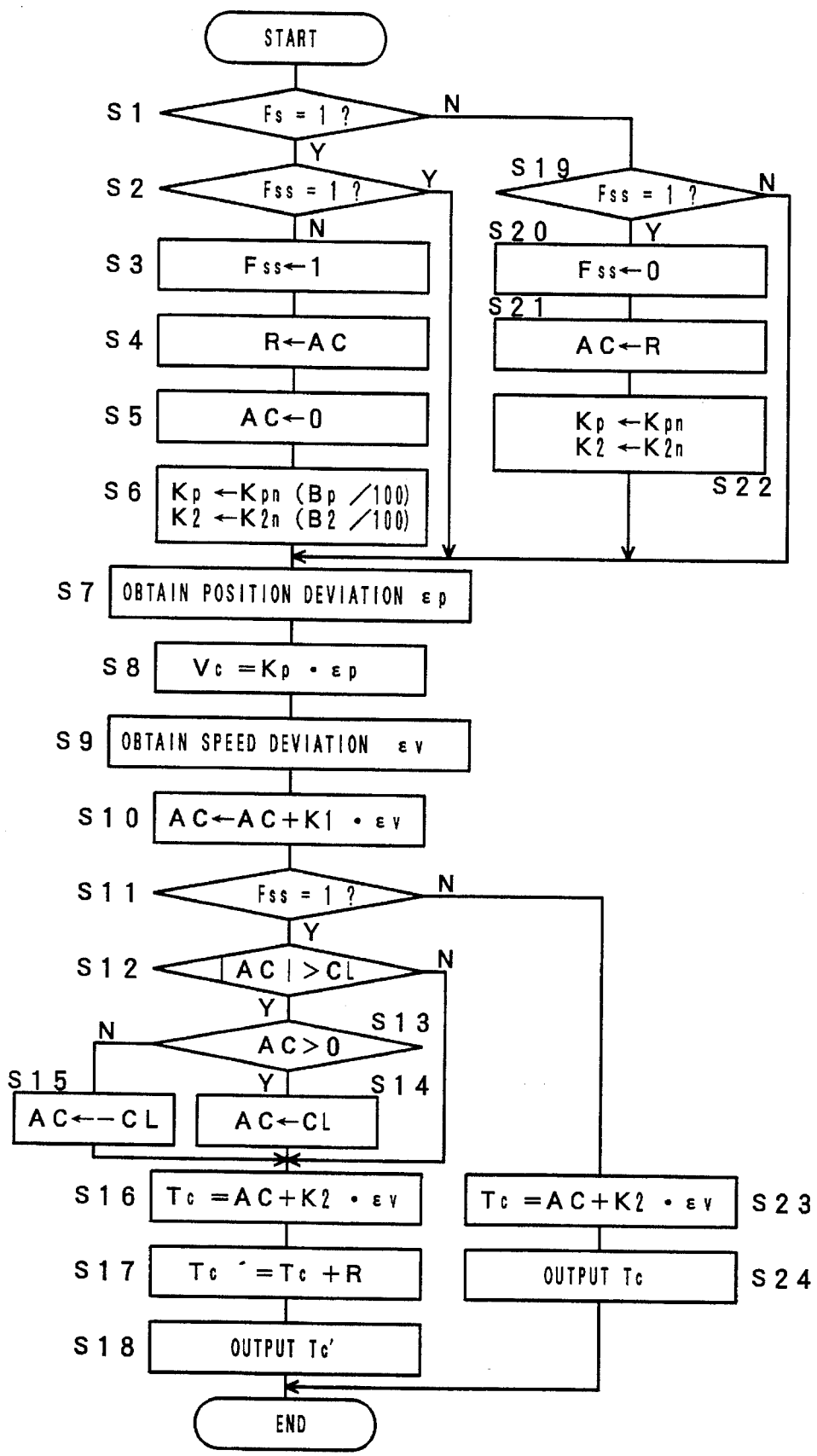
FIG. 4 is a flow chart showing position-speed loop processing according to the same embodiment.

When the operation of the robot is started, the processor of the digital servo circuit 12 executes the processes shown in FIG. 4 at every position-speed loop processing period. First, the processor determines whether or not a flag Fs in the shared memory 11 is set to "1" in response to a flexible control command from the host computer 10 (Step S1). If the flag Fs is not set to "1", then it is determined whether or not a flag Fss, which is indicative of a flexible control state, is set to "1" (Step S19). If this flag Fss is not set either so that the servo control state is normal, conventional position-speed loop processing is executed.

More specifically, the position deviation εp is obtained by integrating values which are obtained by subtracting the position feedback values written in the feedback signal register 13 from the move command r which is obtained from the move command delivered from the host computer 10 through the shared memory 11 (Step S7). The speed command Vc is obtained by multiplying the position deviation εp by the currently set position gain Kp (that is, Kpn set as a value for the conventional servo control) (Step S8). Then, the speed deviation εv is obtained by subtracting the speed feedback value written in the feedback signal register 13 from the speed command Vc (Step S9), and integration processing is executed by adding the product of the speed deviation εv and the set integral gain K1 (=K1n) to the value in the accumulator AC (Step S10). Subsequently, it is determined whether or not the flag Fss, which is indicative of the flexible control state, is set to "1" (Step S11). Since the flag Fss is not set to "1" in this case, the program proceeds to Step S23, whereupon the torque command Tc is obtained by adding the product of the speed deviation εv and the proportional gain K2 (=K2n) to the value in the aforesaid accumulator (output of the integrator), and this torque command Tc is delivered to the current loop (Step S24). Thereupon, the position-speed loop processing for the period concerned terminates. Thereafter, the processing of Steps S1, S19, S7 to S11, S23 and S24 are repeatedly executed at every position-speed loop processing period unless the flexible control command is inputted.

On the other hand, when the region for executing the flexible control is reached; for example, when the robot hand reaches a workpiece mounting position, in the case where the workpiece is to be attached to the machine tool with the robot hand, the flexible control command 10 is outputted from the host computer 10 and the flag Fs of the shared memory 11 is set to "1". The processor of the digital servo circuit 12 then detects in Step S1 that the flag Fs is set to "1", and proceeds to Step S2, whereupon it determines whether or not the flag Fss, which is stored with the flexible control state, is set to "1". Since the flag Fss is not set to "1" at an initial stage, the processor proceeds to Step S3, whereupon it sets the flag Fss to "1", then loads the value (integral value) of the accumulator AC into a register, and then clears the accumulator AC to "0". Also, a value obtained by multiplying the set position gain Kpn for the conventional servo control by the set degree of flexibility (Bp/100) is stored as the position gain Kp. Likewise, a value obtained by multiplying the proportional gain K2n for the conventional servo control by the degree of flexibility (B2/100) for the proportional gain is stored as the position gain K2 (Steps S5 and S6).

As mentioned before, moreover, the position deviation $\epsilon p$ is obtained (Step S7), the speed command Vc is obtained by multiplying the position deviation $\epsilon p$ by the position gain Kp of which value has been lowered in Step S6, the speed deviation $\epsilon v$ is obtained from the speed command Vc and the speed feedback value v, and a value obtained by multiplying the speed deviation $\epsilon v$ by the integral gain K1 is added to the value in the accumulator (Steps S8, S9 and S10). Then, it is determined whether or not the flag Fss for storing the flexible control state is set to "1" (Step S11). Since the flag Fss is set to "1" for the flexible control state in Step S3, in this case, the program proceeds to Step S12, whereupon it is determined whether or not the set clamp value $C_L$ ($C_L>0$) is exceeded by the absolute value of the value in the accumulator AC or the absolute value of the value in the integrator. In the case where the set clamp value is exceeded, the value in the accumulator AC is set to the clamp value $C_L$ if it is positive, and at $-C_L$ if negative (Steps S12 to S15), whereupon the program proceeds to Step S16.

If the set clamp value $C_L$ is not exceeded by the absolute value of the value in the accumulator AC, the program proceeds directly to Step S16. In Step S16, the torque command Tc is obtained by adding the product of the speed deviation $\epsilon v$ obtained in Step S9 and the proportional gain K2 of which value has been lowered in Step S6 to the value in the accumulator AC. A correction torque command Tc' is obtained by adding the value (torque value corresponding to the gravity disturbance and just large enough for the robot to maintain its posture) in the accumulator AC immediately before the start of the flexible control, which is stored in the register R in Step S4, to the obtained torque command Tc (Step S17). This correction torque command Tc' is then delivered to the current loop (Step S18), whereupon the processing for the present position-speed loop processing period terminates.

In the processing for the subsequent periods, unless a flexible control cancel command is delivered from the host computer 10 and the flag Fs is reset to "0", the processes of Steps S1, S2 and S7 to S18 are executed, since the flag Fss is set to "1". More specifically, the position gain Kp is lowered to Kpn×(Bp/100), the proportional gain K2 of the speed control loop is also lowered to K2n×(B2/100), and the integral value in the integrator in a speed control loop process is also limited to the set clamp value $C_L$ or $-C_L$, whereupon the position-speed loop processing is executed. As a result, the output torque of the servomotor takes a small value, so that the operator can manually move the servomotor-controlled robot arm to a desired position in this flexible control state. If the accuracy of the workpiece is so low that the mounting position and the position of the workpiece transported by way of the robot arm are not coincident, in attaching the workpiece to a machine tool, as mentioned before, the robot arm can be manually moved to position the workpiece at the mounting position.

Thus, when the flexible control is finished, and the flexible control cancel command is delivered from the host computer 10, and then the flag Fs is reset to "0" the processor of the digital servo circuit 12 proceeds from Step S1 to Step S19. Further, since the flag Fss is set to "1", the processor proceeds to Step S20, whereupon the flag Fss is reset to "0", the value stored in the register R is set in the accumulator (Step S22), the position gain Kp and the proportional gain K2 of the speed control loop are restored to the normal gains Kpn and K2n, respectively (Step S22), and the conventional position-speed loop processing of Steps S7 to S11, S23 and S24 is executed.

In and after the next position-speed loop processing period, moreover, both the flags Fs and Fss are set to "1", so that the conventional position-speed loop processing of Steps S1, S19, S7 to S11, S23 and S24 is executed.

In the foregoing embodiment shown in FIG. 4, the value in the integrator immediately before the start of the flexible control is loaded into the register, the value in the integrator is reduced to "0" (Steps S4 and S5). The torque command for the current loop is obtained (Step S18) by adding the value in the resistor R to the torque command obtained in the position-speed loop processing (Step S17). However, the processes of Steps S4, S5 and S17 and moreover, the process of Step S21, need not always be provided. Thus, the processes of Steps S4 and S5 are omitted, and the position-speed loop processing is executed after only reloading the position gain Kp and the proportional gain K2 (Step S6). In Steps S12 to S15, the value in the integrator (value in the accumulator AC) is clamped to the set clamp value $C_L$ or $-C_L$ as the torque command Tc is obtained. This torque command Tc is delivered to the current loop.

Also in this case, the output of the integrator never exceeds the set clamp value, so that a command for a large torque cannot be outputted, and no large torque can be delivered from the servomotor. Accordingly, the robot arm can be moved manually. When the flexible control is canceled, the value in the integrator immediately before the start of the flexible control, which is stored in the register R, may be set in the integrator, as shown in FIG. 4. Since the output of the integrator is at the clamp value $C_L$ or $-C_L$, however, the value in the register need not always be set in the integrator.

In the case where the process of Step S17 in FIG. 4 is not executed, the clamp value $C_L$ should be set at a value greater than the clamp value for the embodiment shown in FIG. 4, in consideration of the gravity disturbance.

According to the present invention, as described above, when the flexible command is inputted, the 10 position gain and the proportional gain of the speed control loop are lowered individually to the previously set values, and the output of the integrator of the speed control loop is also clamped as it is delivered, so that the value of the speed command is reduced, and the output of the proportional control in the speed control loop is lowered. Moreover, the output of the integrator, which is clamped, cannot be high, so that the torque command delivered from the speed control loop cannot take a large value. Accordingly, the driven body, which is driven by way of the servomotor, can be moved manually. If the position deviation increases due to the manual movement, the torque command cannot take a large value, since the position gain and the proportional gain of the speed control loop are small and since the integrator is limited to the clamp value. Thus, the manual movement is enabled. In particular, the value in the integrator immediately before the start of the flexible control may be previously stored as a value corresponding to the gravity disturbance in the register so that this value can be added to the torque command delivered from the speed control loop after the start of the flexible control. By doing this, the gravity disturbance can be compensated as the driven body is moved by human power. Since the clamp value to which the output of the integrator is limited is adjusted to the value substantially equivalent to the frictional resistance, moreover, the manual movement of the driven body is facilitated.

When the flexible control is canceled, the position gain and the proportional gain of the speed control loop are restored to the original gains, the integrator is released from the clamping, and the conventional servo control is carried out. In the case where the integral value before the start of the flexible control is stored in the register, in particular, the control after the cancellation of the flexible control is started after setting this integral value in the integrator of the speed control loop, thereby preventing the driven body from falling.

We claim:

1. A flexible servo control method for controlling a servomotor to drive a body, said control system being provided with a position control loop and a speed control loop including an integrator, said method comprising the steps of:

setting a position gain and a proportional gain of the speed control loop to respective predetermined values;

lowering the position gain and proportional gain of the speed control loop to respective lower values in response to a flexible control command input into the control system;

clamping an output of the integrator of the speed control loop to a set value; and driving the servomotor with the clamped output of said integrator in response to the flexible control command so that the body driven by said servomotor can be moved manually.

2. A flexible servo control method according to claim 1, further comprising the steps of:

storing the output of the integrator of the speed control loop upon entry of the flexible control command in a register as an integrator value before said lowering step;

cancelling the flexible control command;

restoring the position gain and the proportional gain of the speed control loop to the original predetermined values and releasing the integrator of the speed control loop from the clamping by restoring the integrator value stored in said register to said integrator; and executing position control loop and speed control loop processing to thereby control the servomotor.

3. A flexible servo control method for controlling a servomotor to drive a body in a control system provided with a position control loop and a speed control loop, comprising the steps of:

lowering a position gain and a proportional gain of the speed control loop to respective predetermined values from respective original values;

storing a value which is disposed in an integrator of the speed control loop in a register and clearing said integrator when a flexible control command is input;

executing position control loop and speed control loop processing in accordance with said lowered position and proportional gains while clamping an output of the integrator to a set value; and driving the servomotor with a torque command produced by adding the value stored in said register to the clamped output from said integrator so that the body driven by said servomotor can be moved manually.

4. A flexible servo control method according to claim 3, further comprising the steps of:

cancelling the flexible control command;

restoring the position gain and the proportional gain of the speed control loop to the respective original predetermined values and releasing the output of the integrator from the clamping when the flexible control command is canceled; and executing position control loop and speed control loop processing to control the servomotor in the control system such that the value stored in said register is set in said integrator.

5. A flexible servo control method according to claim 4, wherein said set value to which the output of said integrator is clamped is a value substantially equivalent to a predetermined frictional resistance.

6. A flexible servo control method according to claim 3, wherein said speed control loop is proportional-plus-integral (PI) control.

7. A flexible servo control method according to claim 3, wherein said speed control loop is integral-plus-proportional (PI) control.

8. A flexible servo control method according to claim 3, wherein said servomotor is a servomotor for moving an arm of a robot.

9. A flexible servo control method according to claim 4, wherein said steps of setting, storing, executing said control loops to drive a value, driving, and executing said control loops to drive the servomotor are sequentially executed by an instructed program.

10. A flexible servo control method according to claim 3, further comprising the steps of: transmitting a position command for said servomotor from a host computer to a digital servo circuit through a shared memory while the digital servo circuit receives position and speed information from the servomotor through a feedback signal register; and executing servo processing by the position control loop and the speed control loop.

* * * * *

UNITED STATES PATENT AND TRADEMARK OFFICE
CERTIFICATE OF CORRECTION

PATENT NO. : 5,581,167
DATED : December 3, 1996
INVENTOR(S) : Tetsuaki KATO, et al.

It is certified that error appears in the above-indentified patent and that said Letters Patent is hereby corrected as shown below:

TITLE PAGE [86] §371 Date:

"January 19, 1995" should be --January 18, 1995--;

TITLE PAGE [86] §102(e) Date:

"January 19, 1995" should be --January 18, 1995--.

Column 2

Line 1, "Z" should be --2--.

Column 4

Line 33, change "sp" to --$\epsilon$p--.

Column 6

Line 52, delete "10".

Signed and Sealed this

Eleventh Day of February, 1997

Attest:

BRUCE LEHMAN

Attesting Officer     Commissioner of Patents and Trademarks